Dec. 24, 1940.   J. R. BROWN ET AL   2,225,608
SAFETY LIQUID LEVEL GAUGE APPARATUS
Filed May 2, 1938   3 Sheets-Sheet 1

Inventors
JOHN ROWLAND BROWN
and DEAN H. BROWNELL
By
Oberlin Limbach & Day
Attorneys Dec. 24, 1940.  J. R. BROWN ET AL  2,225,608
SAFETY LIQUID LEVEL GAUGE APPARATUS
Filed May 2, 1938  3 Sheets-Sheet 2

Inventors
JOHN ROWLAND BROWN
DEAN H. BROWNELL

By Oberlin Limbach + Day
Attorneys

Dec. 24, 1940.  J. R. BROWN ET AL  2,225,608
SAFETY LIQUID LEVEL GAUGE APPARATUS
Filed May 2, 1938  3 Sheets-Sheet 3

Inventors
JOHN ROWLAND BROWN
and DEAN H. BROWNELL.
By Oberlin, Limbach + Day
Attorneys Patented Dec. 24, 1940

2,225,608

UNITED STATES PATENT OFFICE 2,225,608

SAFETY LIQUID LEVEL GAUGE APPARATUS

John Rowland Brown, Cleveland, and Dean H. Brownell, Willoughby, Ohio, assignors to The Reliance Gauge Column Company, Cleveland, Ohio, a corporation of Ohio Application May 2, 1938, Serial No. 205,559

3 Claims. (Cl. 73—299)

Remote-indicating liquid level gauges are installed in some instances in situations where conditions of operation may be erratic and occasionally so abnormal as to endanger accuracy-continuity of the system. For instance, if the container which is gauged should be subjected to an abnormal drainage instead of running along on the range of fluctuation to which it was accustomed, the indicator liquid in the gauge might be drawn out of the gauge, and a refilling be necessitated before the gauge could again operate. In accordance with the present invention such possibilities are eliminated, notwithstanding vicissitudes of abnormal character which may occur with the container, and the accuracy and operativeness of the gauge is maintained throughout various possible conditions.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

Figure 1:
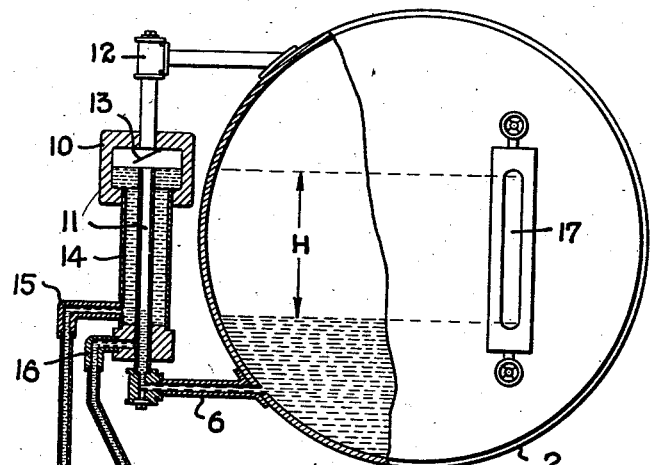
Figure 4:
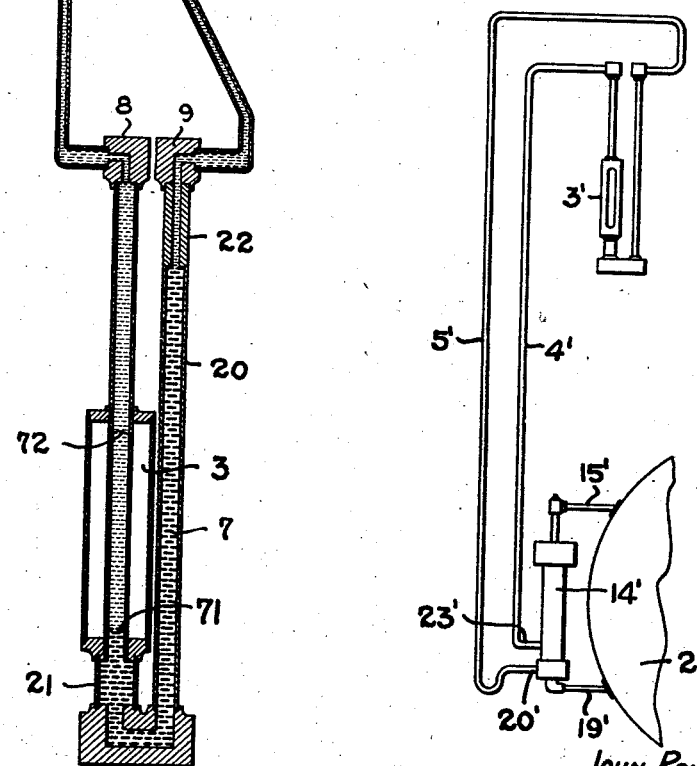
Figures 2, 5:
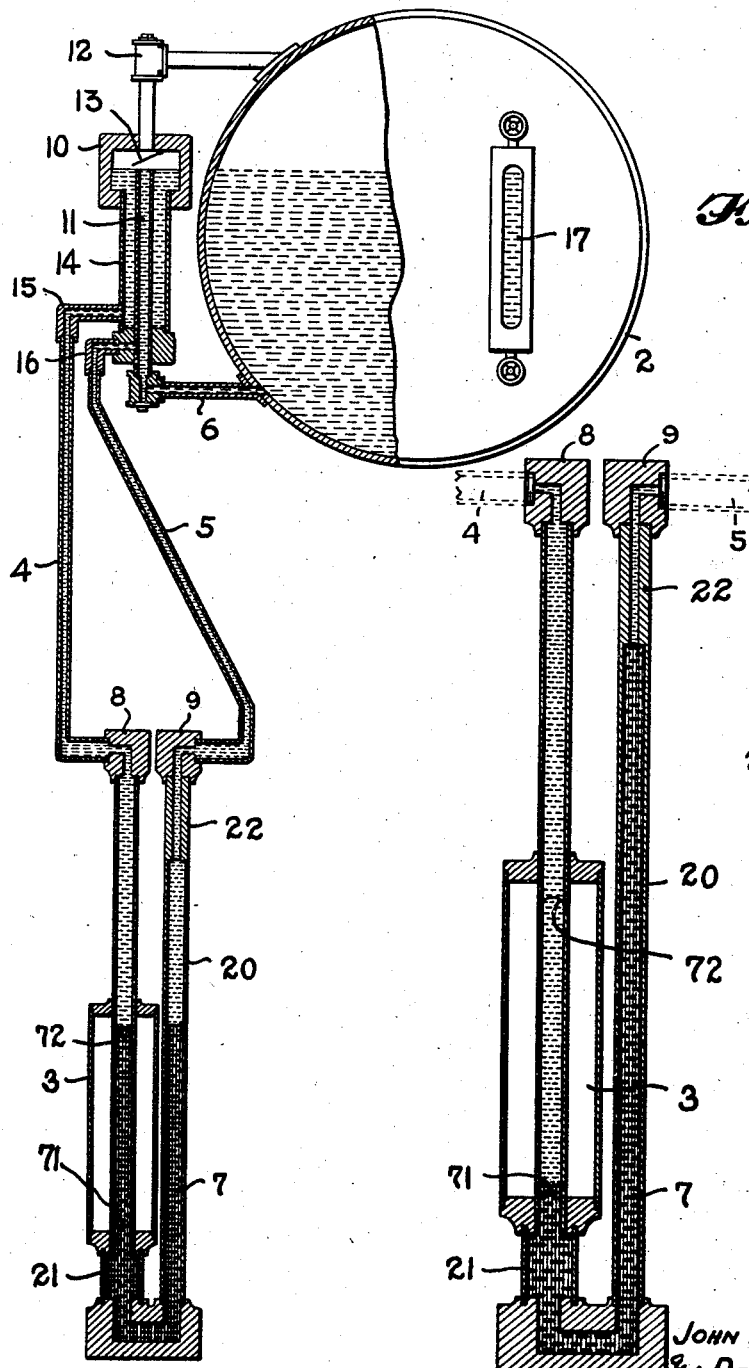
Figure 3:
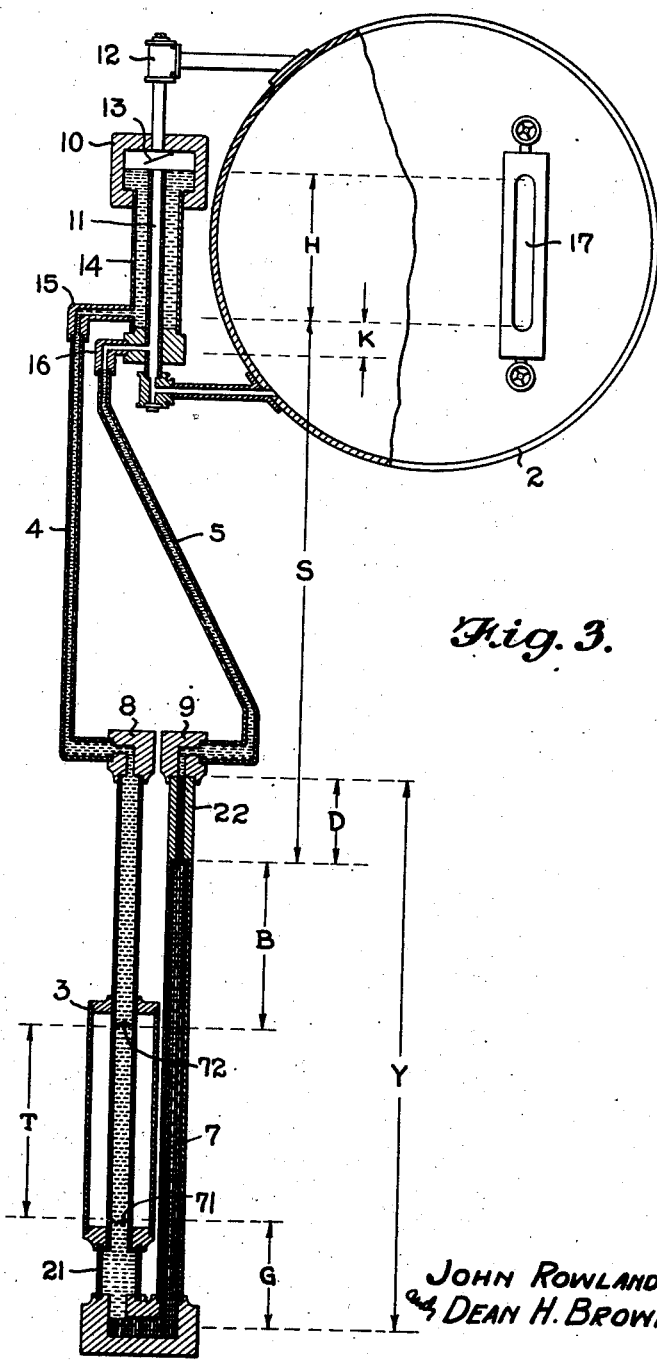

In said annexed drawings:

Figs. 1, 2 and 3 are semi-diagrammatic elevational views showing an embodiment of the invention, under various conditions affecting the container being gauged; Fig. 4 shows a slightly different arrangement and Figure 5 is an enlarged view of the U tube as it appears under the conditions shown in Figure 1.

The container 2 to be gauged, as illustrated is connected with a viewing gauge 3 (shown diagrammatically) by conduit 4 communicating from a datum point of constant head, and a conduit 5 communicating the fluctuating head from the lower portion of the container, the conduit 4 being in communication with one end 8 of the U tube, shown enlarged in Figure 5 and conduit 5 with the other end 9. In the gauge is a column of indicating liquid 7. The datum point of constant head for the communicating line 4 is provided by a chamber 10 having a level-fixing overflow tube 11. In the case of a steam boiler drum or the like operating with a vapor above the liquid, condensate as occasioned by condensation in piping 12 leading from the vapor space gives a sufficient abundance in the chamber 10. A deflector 13 may be arranged to divert the liquid, as it goes down, away from the draining tube 11 and into the liquid space of the chamber. The conduit 4 is connected conveniently, as by outlet 15, to the lower portion of a downward extension 14 of the chamber 10. A connection 16 joins the conduit 5 into communication with the lower portion of the inner tube. The connection 16 to conduit 5 is above the pipe 6 to the container and is spaced below the constant level point or top of overflow tube 11 a distance amounting to that contemplated as the range between high and low, as in the glass 17 on the drum (see Fig. 1), together with that down to the final low contemplated for the container (see Fig. 3). It will be observed that in such arrangement liquid remains in the variable leg 5 at least up to height 16 under all conditions, even though the drum be completely empty, as represented in Fig. 3. Moreover, the constant head leg 4, etc., always has a column of liquid extending up to the datum level or the over-flow point of the tube 11 which drains back to and communicates with the liquid in the container, the liquid level in the tube 11 being even with that in the container. Between the viewing gauge 3 and end 9 of the U tube, which communicates with the conduit 5 of the variable head, is a calibration tube 20 which is dimensioned such as to compensate the travel of the indicating liquid 7 in the viewing gauge to correlated ratio with the travel of fluctuation in the container 2 which is being gauged. Between the viewing gauge 3 and the calibration tube 20 is a safety accumulator, or safety reserve chamber 21, and between the calibration tube 20 and the end 9 of the U tube communicating with conduit 5 is a safety head chamber 22.

Thus it will be seen that I have provided a separate unit as shown in Figure 5, this unit being a U tube comprising a viewing gauge 3, a safety reserve chamber 21, a calibration tube 20, and a safety head chamber 22. This unit can be connected by screw threads or other means to the conduits 4 and 5 in the manner shown in Figures 1, 2 and 4.

The total vertical variation normally to be measured for the container 2 may be represented by H, and the travel of the indicator fluid in the viewing gauge 3 from 71 to 72 may be represented by T, and the rise of indicating fluid in the calibration tube required to balance H and make T move proportionally to H is represented by B; an extra fluid head D is thus then provided, which becomes operative during abnormal conditions, as for instance when the drum 2 is completely emptied, to prevent loss of the indicator fluid or any escape from the instrument into the conduit; and below the viewing gauge 3 is an increased volume 21 of indicator fluid required to feed the D tube, and which may be represented by G; the vertical distance connecting between the calibration tube and the predetermined low water level may be represented by the letter S, and the vertical distance from the ordinary low water level to the variable head tube connection by K, and the maximum indicator fluid head required to hold in equilibrium $H+K$ may be represented by Y. Taking the specific gravity of steam as $C_v$ the specific gravity of the indicator fluid as $C_f$, and the specific gravity of the water in the drum at normal working steam pressure $C_p$, and the specific gravity of the liquid in the connecting tubing at room temperature or prevailing temperature as $C_r$, and $A_t$ as the sectional area of the viewing gauge 3, $A_b$ the sectional area of the calibration tube 20, and $A_d$ the sectional area of the D tube, and $A_g$ the sectional area of the G tube, equilibrium of the system at low water level, as in Fig. 1, is found to be $GC_f+TC_f+BC_f+SC_r+HC_v = GC_f+TC_r+BC_r+SC_r+HC_p$. And $BC_f-BC_r = HC_p+TC_r-TC_f-HC_v$.

Thus in event of a condition as in Fig. 3, in which the drum 2 is emptied and the constant head side 4 contains liquid and the variable head side 5 is down to the level of the elbow connection 16, the indicator liquid 7 instead of being drawn out of the instrument is in equilibrium as the head Y, extending into the suitably-dimensioned extra head chamber 22. The indicator liquid cannot be pulled out of certain safety limits. When the liquid in the container 2 is at its predetermined high level, as shown in Fig. 2, the indicator liquid 7, fills the suitably-dimensioned accumulator chamber 21 and registers at the top of the viewing gauge. When the liquid in the container 2 is at predetermined low level, as shown in Fig. 1, the indicator liquid registers at the bottom of the viewing gauge.

The viewing gauge may be located where convenient, whether below the container gauged or higher. As illustrated in Fig. 4, the gauge 3' is for instance above the container 2', and the communicating conduits 4', 5' above the connections 23', 20' leading to the constant level and fluctuating level as aforeprovided.

Other modes of applying the principle of the invention may be employed, change being made as regards the details described, provided the features stated in any of the following claims, or the equivalent of such, be employed.

We therefore particularly point out and distinctly claim as our invention:

1. In remote-indicating liquid level gauge apparatus a U tube with one end thereof adapted to communicate from a datum point of constant head and the other end adapted to communicate with the lower portion of a container to be gauged; said U tube comprising, a viewing gauge, a calibration tube between said other end and said viewing gauge, an indicator liquid in said viewing gauge, the indicator liquid communicating from the calibrating tube to the viewing gauge, and means for preventing draining the indicator liquid away from the viewing gauge on draining the container being gauged, said means including a safety head chamber between said other end and said calibration tube and a safety reserve chamber between the viewing gauge and the calibration tube, the volumetric capacity of said safety reserve chamber being sufficient to feed said safety head chamber, whereby the head of indicating fluid is increased sufficiently to impart static equilibrium throughout the system.

2. In remote-indicating liquid level gauge apparatus a U tube with one end thereof adapted to communicate from a datum point of constant head and the other end adapted to communicate with the lower portion of a container to be gauged; said U tube comprising, a viewing gauge, a calibration tube between said other end and said viewing gauge, an indicator liquid in said viewing gauge, the indicator liquid communicating from the calibrating tube to the viewing gauge, and means for preventing draining the indicator liquid away from the viewing gauge on draining the container being gauged, said means including a safety head chamber between said other end and said calibration tube, said safety head chamber being of reduced diameter, whereby the head of indicating fluid is increased sufficiently to impart static equilibrium throughout the system, and a safety reserve chamber between the gauge and the calibration tube.

3. In remote-indicating liquid level gauge apparatus a U tube with one end thereof adapted to communicate from a datum point of consant head and the other end adapted to communicate with the lower portion of a container to be gauged; said U tube comprising, a viewing gauge, a calibration tube between said other end and said viewing gauge, an indicator liquid in said viewing gauge, the indicator liquid communicating from the calibrating tube to the viewing gauge, and means for preventing draining the indicator liquid away from the viewing gauge on draining the container being gauged, said means including a safety head chamber between said other end and said calibration tube, said safety head chamber being of reduced diameter, whereby the head of indicating fluid is increased sufficiently to impart static equilibrium throughout the system, and a safety reserve chamber between the gauge and the calibration tube, the volumetric capacity of said safety reserve chamber being sufficient to feed said safety head chamber.

JOHN ROWLAND BROWN.
DEAN H. BROWNELL.